(12) United States Patent
Kambayashi et al.

(10) Patent No.: US 8,795,882 B2
(45) Date of Patent: Aug. 5, 2014

(54) BATTERY

(75) Inventors: Hirokazu Kambayashi, Kyoto (JP); Yu Shiraishi, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 0 days.

(21) Appl. No.: 13/316,248

(22) Filed: Dec. 9, 2011

(65) Prior Publication Data
US 2012/0148910 A1 Jun. 14, 2012

(30) Foreign Application Priority Data
Dec. 10, 2010 (JP) ................................. 2010-276204

(51) Int. Cl.
*H01M 2/02* (2006.01)
*H01M 2/06* (2006.01)

(52) U.S. Cl.
CPC ...................................... *H01M 2/06* (2013.01)
USPC ............ 429/179; 429/122; 429/163; 429/178

(58) Field of Classification Search
CPC .................................. H01M 2/06; H01M 2/30
USPC .................................. 429/179, 178, 163, 122
See application file for complete search history.

(56) References Cited

U.S. PATENT DOCUMENTS

| | | | |
|---|---|---|---|
| 3,548,264 A | 12/1970 | Carino et al. | |
| 3,680,203 A | 8/1972 | Braiman et al. | |
| 3,686,538 A | 8/1972 | Webster | |
| 4,045,862 A | 9/1977 | Evans et al. | |
| 4,074,417 A | 2/1978 | Pearce et al. | |
| 5,665,483 A * | 9/1997 | Saito et al. | ....................... 429/53 |
| 5,849,431 A | 12/1998 | Kita et al. | |
| 6,159,630 A * | 12/2000 | Wyser | ............................. 429/57 |
| 6,190,798 B1 | 2/2001 | Okada et al. | |
| 2002/0022408 A1* | 2/2002 | Fukuda | ......................... 439/761 |
| 2004/0023108 A1 | 2/2004 | Nakanishi et al. | |
| 2006/0051664 A1 | 3/2006 | Tasai et al. | |
| 2008/0131760 A1 | 6/2008 | Yamagami et al. | |

(Continued)

FOREIGN PATENT DOCUMENTS

| | | |
|---|---|---|
| GB | 2 154 049 A | 8/1985 |
| JP | 59-58754 A | 4/1984 |

(Continued)

OTHER PUBLICATIONS

U.S. Appl. No. 13/087,130 (43 pages of Specification and Drawings Figures 1-8).

(Continued)

*Primary Examiner* — Barbara Gilliam
*Assistant Examiner* — Gary Harris
(74) *Attorney, Agent, or Firm* — McGinn IP Law Group, PLLC (57) ABSTRACT

An outside gasket for insulating a cover from an external terminal to be fixed thereto is readily fixed to the cover irrespective of a simple structure. A battery includes: a battery case which contains a power generating element therein and whose top surface is opened; a cover which closes the top surface; at which an external terminal exposed to the outside is disposed at the outer surface of the cover via an outside gasket, the cover having an engagement portion which expands outward and is formed into a shape except a circle, and the outside gasket having a recess to be engaged to the engagement portion.

20 Claims, 7 Drawing Sheets

(56) References Cited

U.S. PATENT DOCUMENTS

| | | |
|---|---|---|
| 2008/0220316 A1 | 9/2008 | Berkowitz et al. |
| 2009/0169989 A1 | 7/2009 | Morikawa et al. |
| 2010/0021811 A1 | 1/2010 | Kado et al. |
| 2010/0047686 A1 | 2/2010 | Tsuchiya et al. |
| 2010/0081048 A1 | 4/2010 | Nansaka et al. |
| 2010/0092858 A1 | 4/2010 | Takashiro et al. |
| 2010/0129709 A1 | 5/2010 | Matsubara |
| 2010/0173178 A1 | 7/2010 | Kim et al. |
| 2011/0300435 A1* | 12/2011 | Byun ............ 429/178 |
| 2012/0264001 A1 | 10/2012 | Tsuchiya et al. |
| 2012/0264003 A1 | 10/2012 | Tsuchiya et al. |
| 2012/0264004 A1 | 10/2012 | Tsuchiya et al. |
| 2012/0264005 A1 | 10/2012 | Tsuchiya et al. |
| 2012/0264006 A1 | 10/2012 | Tsuchiya et al. |

FOREIGN PATENT DOCUMENTS

| | | |
|---|---|---|
| JP | 2001-93485 A | 4/2001 |
| JP | 2001-357833 A | 12/2001 |
| JP | 2002-324541 A | 11/2002 |
| JP | 2003-157812 A | 5/2003 |
| JP | 2003-323869 A | 11/2003 |
| JP | 2003-346778 A | 12/2003 |
| JP | 2005-56649 A | 3/2005 |
| JP | 2008-251213 A | 10/2008 |
| JP | 2009-277604 A | 11/2009 |
| JP | 2009277604 A * | 11/2009 |
| JP | 2009-283335 A | 12/2009 |
| JP | 2010-97764 A | 4/2010 |
| JP | 2010-97822 A | 4/2010 |
| WO | WO 2008/016152 A1 | 2/2008 |
| WO | WO 2008/084883 A2 | 7/2008 |
| WO | WO 2009/107657 A1 | 9/2009 |

OTHER PUBLICATIONS

Extended European Search Report dated Apr. 17, 2012.
Extended European Search Report dated May 7, 2012.
US Office Action for co-pending related U.S. Appl. No. 13/087,130 dated Nov. 13, 2012.
US Office Action for co-pending related U.S. Appl. No. 13/087,146 dated Nov. 13, 2012.
U.S. Notice of Allowance dated Jul. 18, 2013, for U.S. Appl. No. 13/336,947.
US Office Action for co-pending related U.S. Appl. No. 13/087,130 dated Apr. 10, 2013.
US Office Action for co-pending related U.S. Appl. No. 13/087,146 dated Apr. 10, 2013.
Office Action dated Aug. 14, 2013 in U.S. Appl. No. 13/087,130.
United States Office Action dated Aug. 14, 2013, in U.S. Appl. No. 13/336,954.
Notice of Allowance dated Jul. 18, 2013 in U.S. Appl. No. 13/336,947.

* cited by examiner

BATTERY

The present application is based on and claims priority from Japanese patent application No. 2010-276204, filed on Dec. 10, 2010, the entire content of which is incorporated herein by reference.

BACKGROUND OF THE INVENTION

1. Field of the Invention

The present invention relates to a battery featured by a sealing structure at a connection portion of an external terminal, that is, a structure of an outside gasket.

2. Description of the Related Art

There has been conventionally known, as a battery, a configuration in which a riveted terminal is fixed to a cover plate via an outer insulating/preventing plate (see, for example, JP-A-2003-157812). The outer insulating/preventing plate has a square recess formed at the outer surface thereof and a projection having a through hole at an inner surface on an opposite side thereof. A flange for the riveted terminal is held in the square recess, and further, a current collecting rivet for the riveted terminal is inserted into the through hole. The current collecting rivet is caulked via the cover plate, the insulating/preventing plate, and a current connector, to thus secure these members.

However, the conventional battery includes the outer insulating plate which is merely brought into contact with the upper surface of a flat cover but does not include any structure for restricting movement in a rotational direction. Therefore, the outer insulating plate may be positionally deviated in the rotational direction when the riveted terminal is fixed, thereby making assembly work cumbersome.

SUMMARY OF THE INVENTION

An object of the present invention is to provide a battery configured such that an outside gasket for insulating a cover from an external terminal to be fixed thereto is readily fixed to the cover irrespective of a simple structure.

According to a first aspect of the invention, a battery includes: a battery case which contains a power generating element therein and whose top surface is opened; a cover which closes the top surface; at which an external terminal exposed to the outside is disposed at the outer surface of the cover via an outside gasket, the cover having an engagement portion which expands outward and is formed into a shape except a circle, and the outside gasket having a recess to be engaged to the engagement portion.

When the external terminal is fixed to the cover, the recess of the outside gasket is engaged to the engagement portion formed at the cover, thereby preventing positional deviation in a rotational direction. Consequently, it is possible to efficiently fix the external terminal.

According to a second aspect of the invention, a battery includes: a battery case which contains a power generating element therein and whose top surface is opened; a cover which closes the opening, the cover having a current collector to be connected to the power generating element via an inside gasket and having an external terminal exposed to the outside fixed via an outside gasket, the cover has: a through hole and an engagement portion which expands outward and is formed into a shape except a circle, the external terminal has a shaft and plate portion at the other end of the shaft, the external terminal being caulked at one end of the shaft through the outside gasket, the cover, the inside gasket, and the current collector; and the outside gasket having a recess to be engaged to the engagement portion and a tubular portion which is inserted into the through hole formed in the cover, is fitted to the shaft of the external terminal, and is fitted to a through hole formed in the inside gasket.

In the outside gasket, the engagement portion formed at the cover is located in the recess, thereby preventing the positional deviation in the rotational direction. Consequently, when the cover, the inside gasket, and the current collector are assembled via the shaft of the external terminal, followed by securely caulking, the workability can be enhanced without any need of taking care of the positional deviation of the outside gasket.

The outside gasket may include the recess and another recess, to which the plate portion of the external terminal is arranged, by dividing a frame member via a partition.

Since the plate portion of the external terminal is arranged in the recess, the external terminal is not positionally deviated by securely caulking. Further, even if the rotational power is operated to the external terminal as the opposed end of the shaft is the plate portion, the rotation of the external terminal is prevented.

The cover may have a lock portion formed at the outer surface thereof, and the outside gasket may have a tongue piece extending along the cover formed therein, the tongue piece having a locked portion to be locked to the lock portion in the state in which the outside gasket is engaged to the engagement portion in the cover.

With this configuration, the outside gasket can be prevented from being positionally deviated in the rotational direction by locking the locked portion of the tongue piece to the lock portion in the cover.

DETAILED DESCRIPTION OF PREFERRED EMBODIMENTS

Hereinafter, an embodiment according to the present invention will be described with reference to the attached drawings. In the following description, the terms indicating specific directions or positions (including, for example, "above," "below," "side," and "end") are used, as required. Here, the use of the terms is directed to facilitating the understanding of the invention referring to the drawings, and therefore, the meanings of the terms should not restrict the technical scope of the present invention. Moreover, the following description is merely an essential example, and therefore, should not intend to restrict the present invention and its application or usage.

Figure 1:
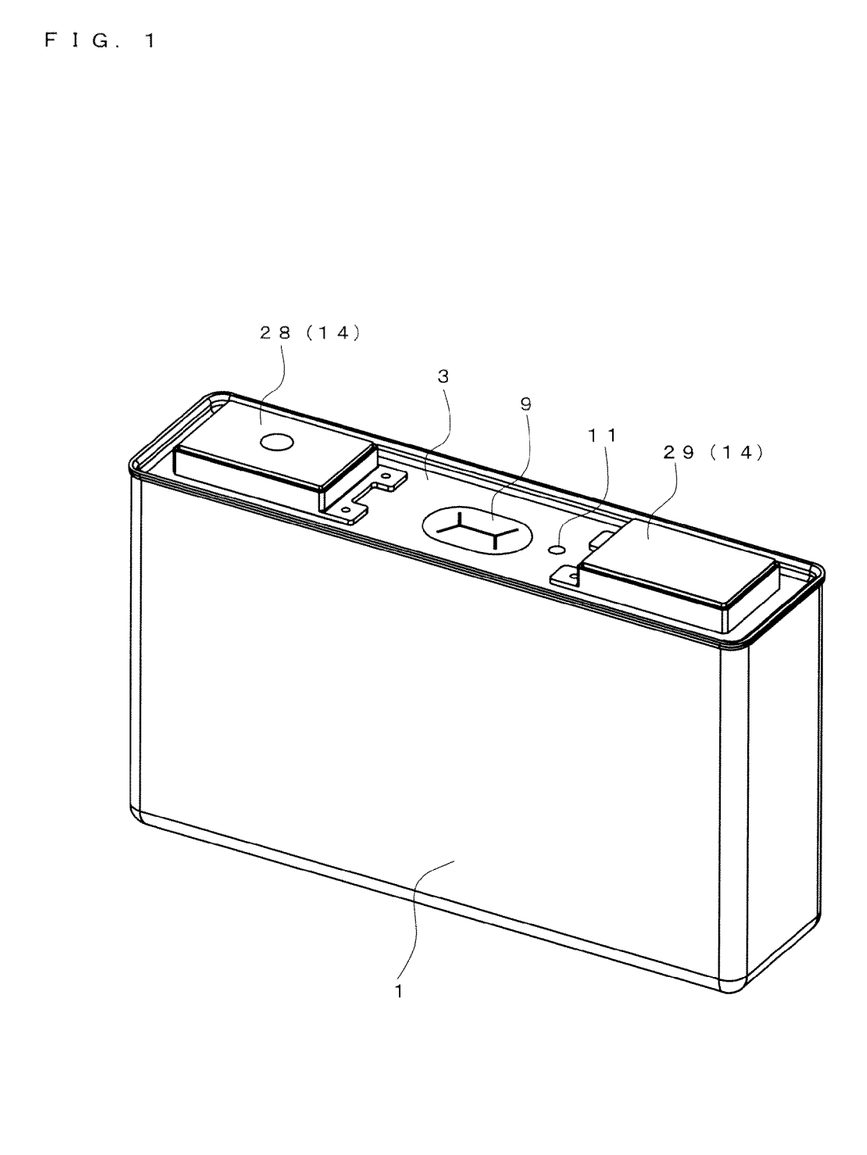
FIG. 1 is a perspective view showing a battery in accordance with the present embodiment.
Figure 2:
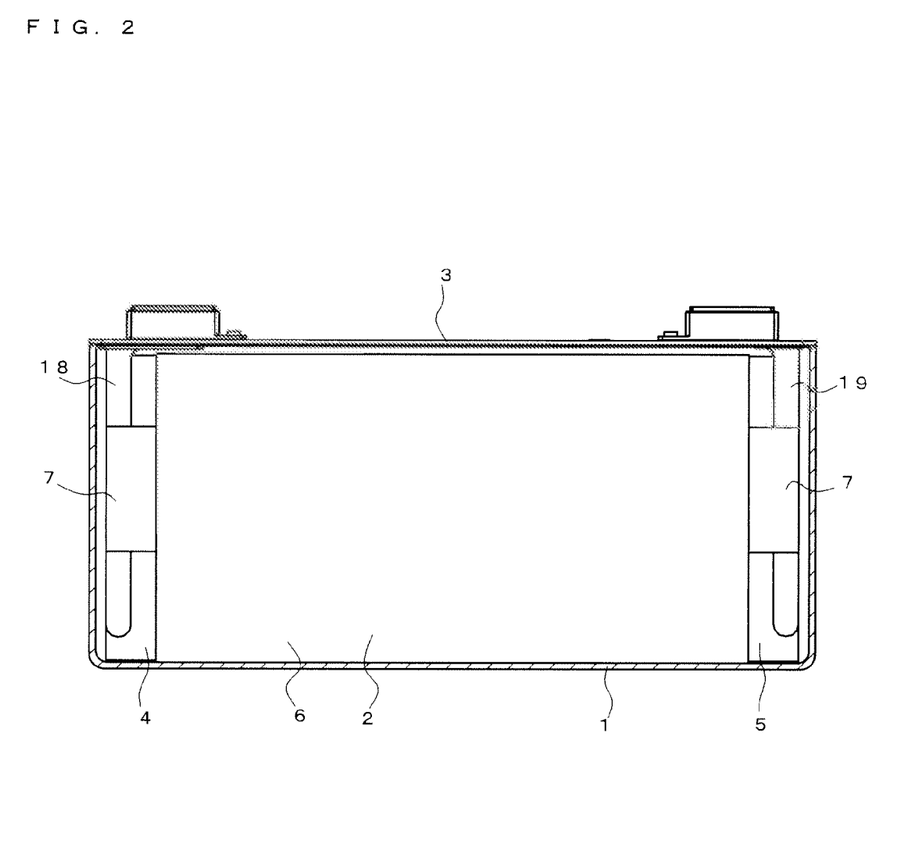
FIG. 2 is a front cross-sectional view showing the battery in accordance with the present embodiment.
Figure 3:
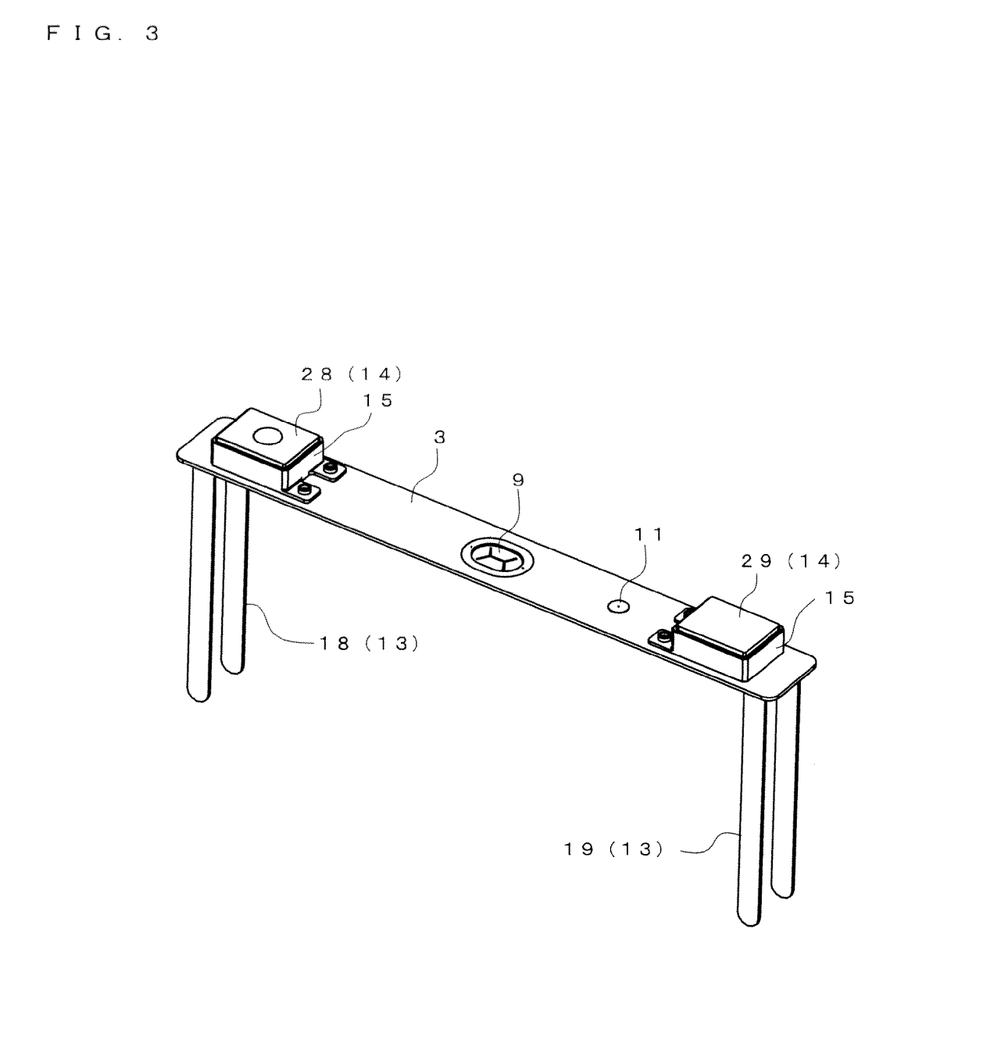
FIG. 3 is a perspective view showing a cover shown in FIG. 1, as viewed from the top.

FIG. 1 shows a nonaqueous electrolytic secondary battery. The nonaqueous electrolytic secondary battery contains a power generating element 2 inside of a battery case 1, and is sealed with a cover 3, as shown in FIG. 2. Here, the battery case 1 and the cover 3 constitute an envelope member.

The battery case 1 is formed into a rectangular parallelepiped shape opened at the upper surface thereof, and is made of aluminum or an aluminum alloy, etc.

In the power generating element 2, a separator 6 made of a porous resin film is interposed between a negative electrode 4 including a copper foil and a positive electrode 5 including an aluminum foil, like the prior art, although its details will not be shown. All of these members are formed into a belt shape, and further, the negative electrode 4 and the positive electrode 5 are flat wound in such a manner as to be contained inside of the battery case 1 in the state in which they are positionally deviated oppositely with respect to the separator 6 in a widthwise direction. As described later, a negative electrode current collector 18 is connected to the negative electrode 4 via a clip 7 whereas a positive electrode current collector 19 is connected to the positive electrode 5 via another clip 7.

As shown in FIGS. 3 to 6, the cover 3 is made of a metallic elongated plate formed into a rectangular shape, as viewed on plane. A substantially elliptic opening 8 having a step from the upside is formed at the center of the cover 3. A safety valve 9 made of a synthetic resin is engaged to the opening 8. A substantially H-shaped thin portion is formed at the safety valve 9. The thin portion is torn in the case of an abnormal increase in inner pressure, so that pressure can be decreased.

A small-diameter liquid injection hole 10 is formed at one end of the cover 3, and it is designed to be closed via a plug 11 after liquid injection.

An engagement portion 12, which is formed into a substantially rectangular shape, as viewed on plane, and expands upward, is formed at the lower surface at each of both ends of the cover 3. In the engagement portion 12, a shallow guide recess 12b is formed around a engaged recess 12a at the lower surface except one side. Moreover, a through hole 12c is formed at the center of a ceiling constituting the engaged recess 12a. An external terminal 14 and a current collector 13 are adapted to fit to the engaged recess 12 and the guide recess 12b via a lower gasket 15 and an upper gasket 16, respectively.

Lock projections 17 projecting upward from two portions in the widthwise direction are formed in the vicinity of the inside of each of the engagement portion 12 in the cover 3. Each of the lock projections 17 is formed into a bottomed tubular shape at the same time when the cover 3 is pressed. The upper gasket 15, described later, is locked to the lock projections 17, to be thus positioned in a rotational direction.

Figure 4:
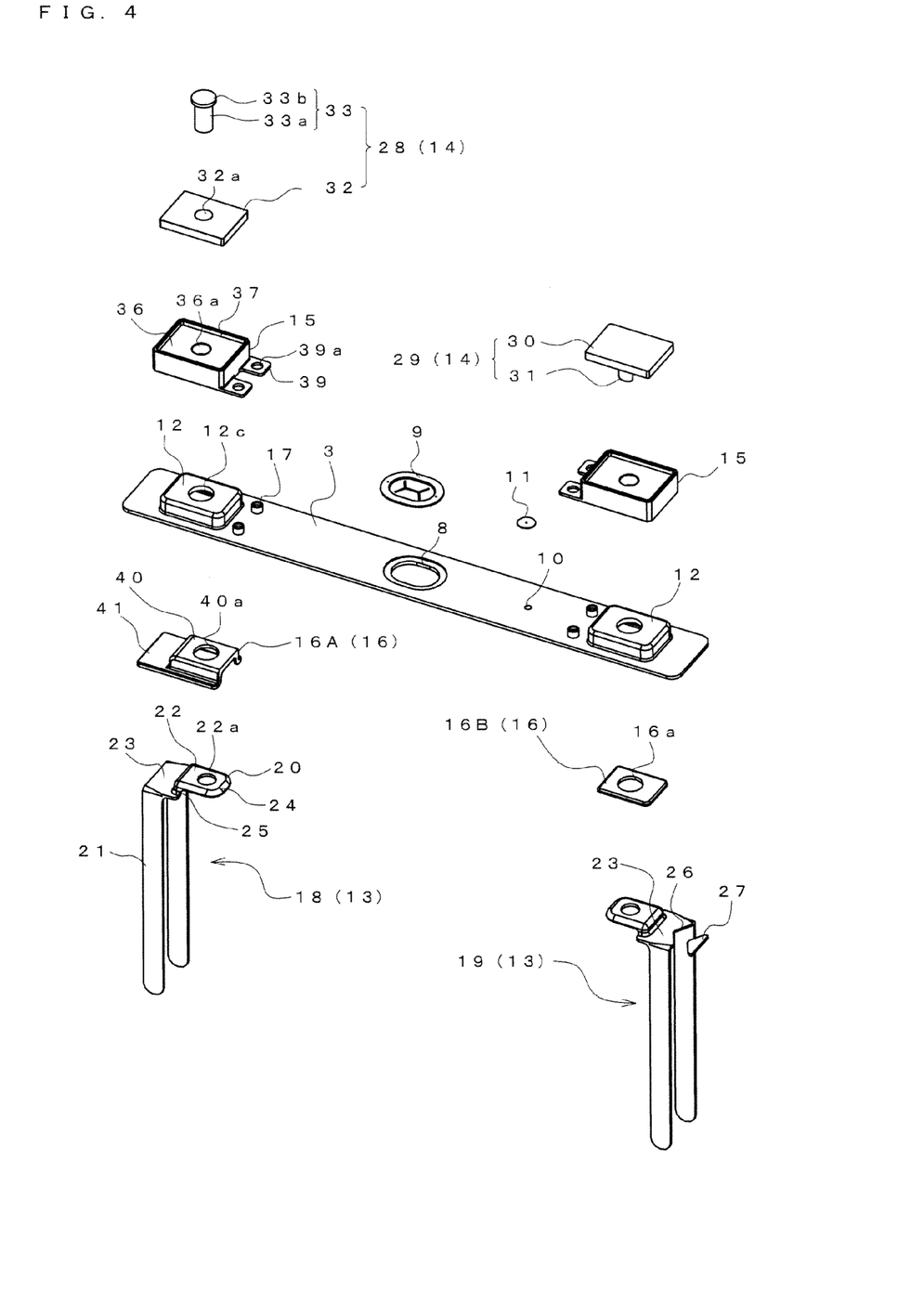
FIG. 4 is an exploded perspective view showing the cover shown in FIG. 3.
Figure 5:
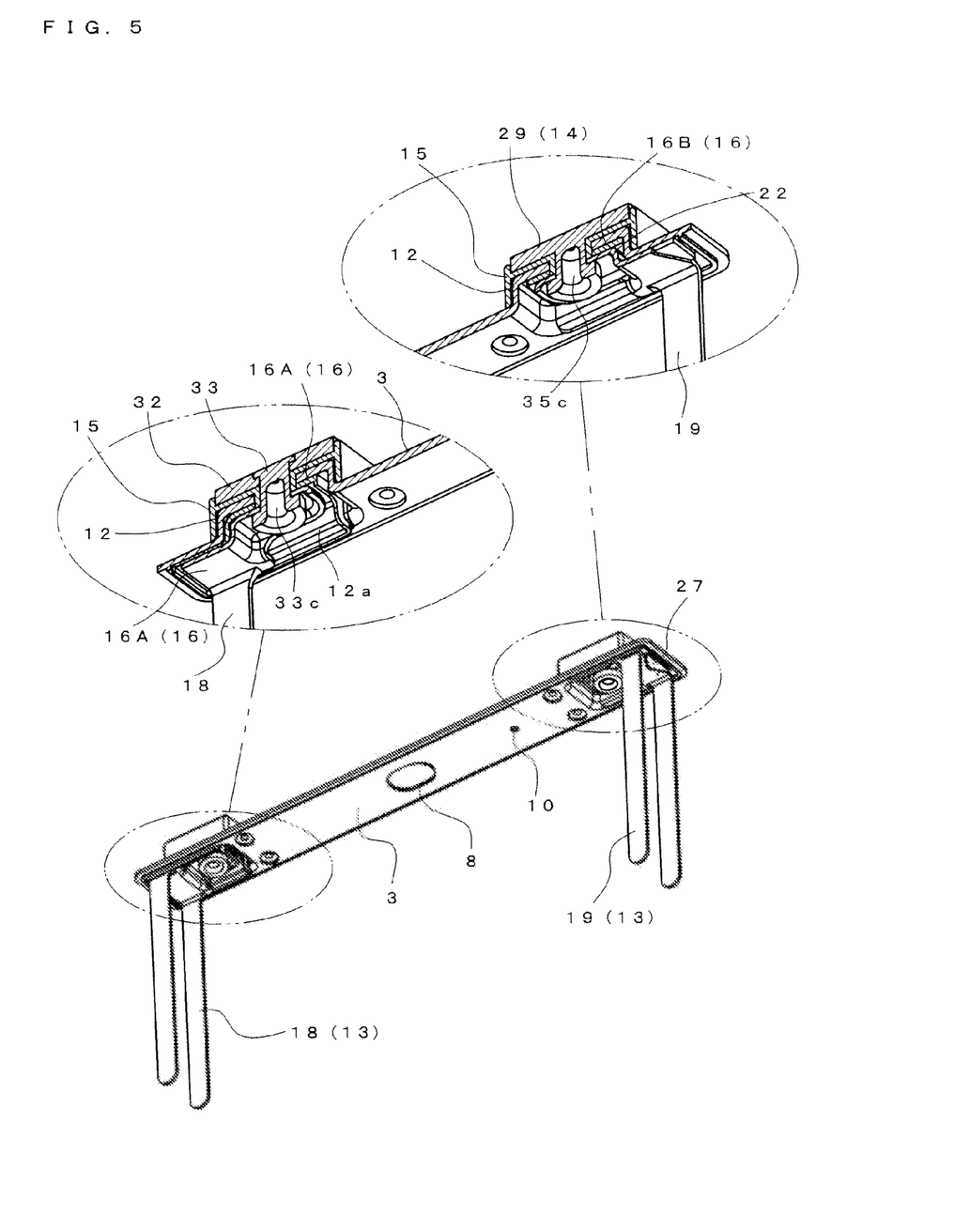
FIG. 5 is a perspective view showing the cover, as viewed from the bottom and cross-sectional views showing the cover, as viewed in partly enlargement.
Figure 6:
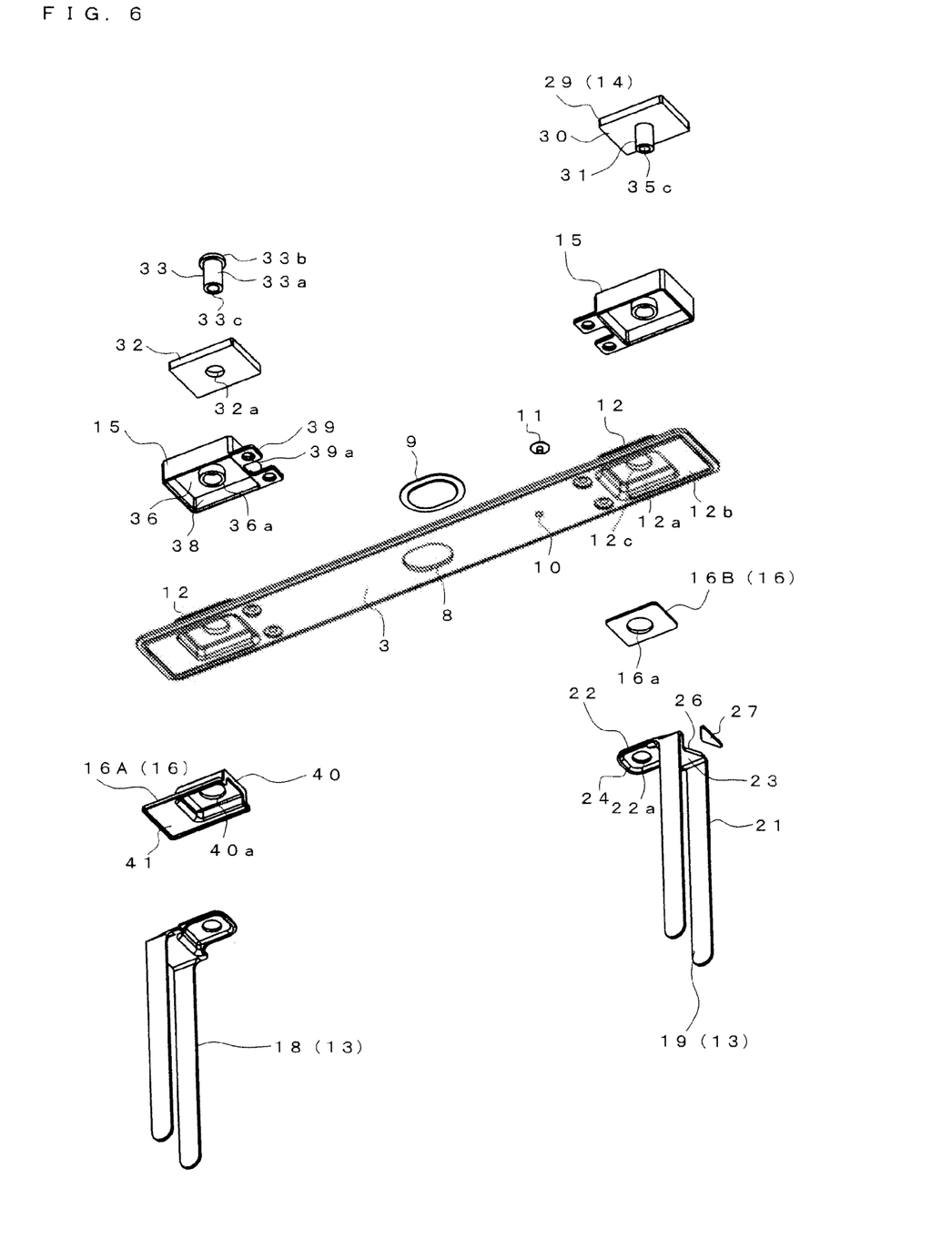
FIG. 6 is an exploded perspective view shown in FIG. 5.

The current collectors 13 include the negative current collector 18 made of copper and the positive current collector 19 made of aluminum. In the current collector 13, a connection receiver 20 and legs 21 extending from both sides of the connection receiver 20 are formed by pressing a metallic elongated plate material. The connection receiver 20 is constituted of a fitting portion 22 to be engaged to the recess formed at the cover 3 and a mount portion 23 continuous to the fitting portion 22. The fitting portion 22 is formed into a planar shape, and has a through hole 22a at the center thereof and a guide edge 24 extending in a vertical direction at the circumferential edge except one side continuous to the mount portion 23. The side of the mount portion 23 functions as a continuous portion 25 extending further beyond the guide edge 24, and thus, reaches the mount portion 23. The guide edge 24 and the continuous portion 25 satisfactorily enhance the rigidity of the connection receiver 20 in the current collector 13.

The legs 21 extend in the vertical direction from both side edges of the mount portion 23 along both side surfaces of the power generating element 2. The legs 21 are connected to the positive electrode 5 or the negative electrode 4 in the power generating element 2 via the clip 7. Positional deviation can be prevented since the clip 7 is held between the inner surfaces, opposite to each other, of the battery case 1.

The external terminals 14 include a negative electrode external terminal 28 and a positive electrode external terminal 29. The external terminal 14 includes a flat plate 30 and a shaft 31 extending downward from the center at a lower surface thereof. To a surface (an exposed surface) of the flat plate 30 is welded a bus bar, not shown.

Figure 7A:
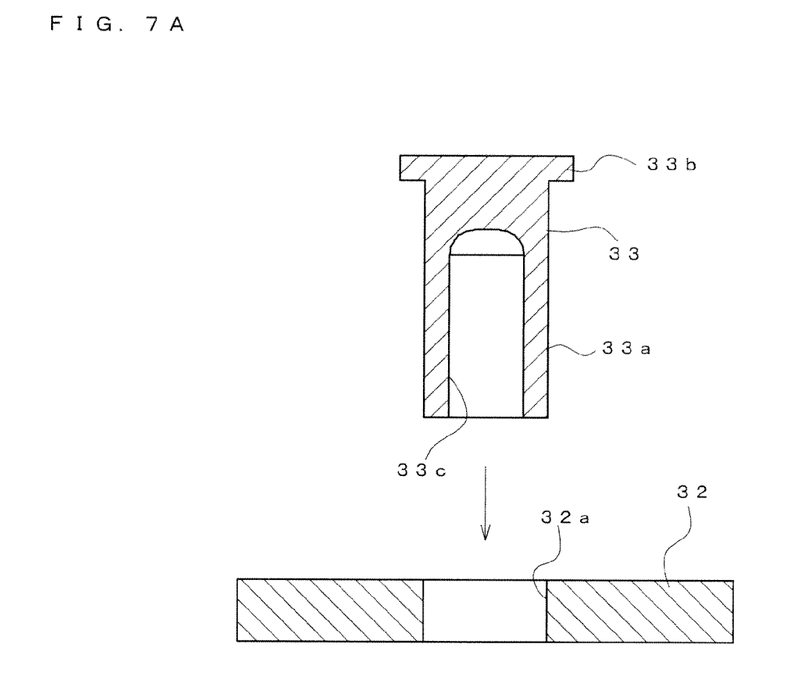
FIGS. 7A and 7B are cross-sectional views illustrating fabrication processes for a negative electrode terminal shown in FIG. 4.
Figure 7B:
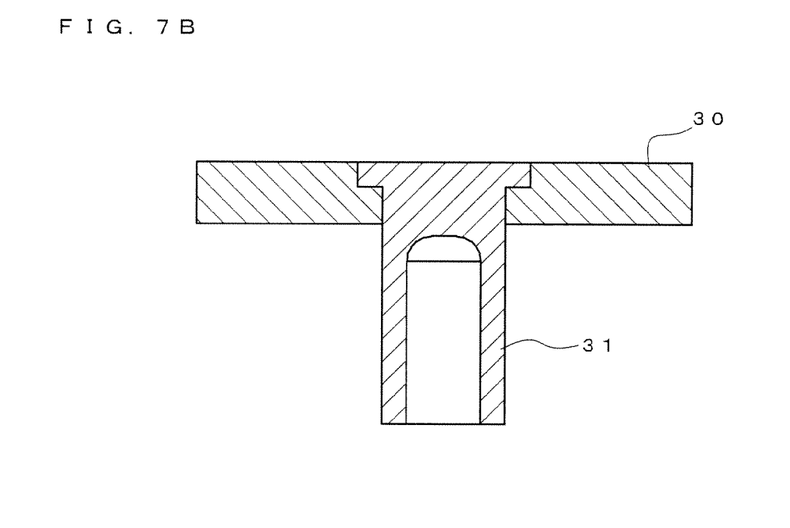

As shown in FIG. 7, the negative electrode external terminal 28 is formed of an aluminum plate 32 formed into a rectangular shape, as viewed on plane, and a copper rivet 33. That is to say, a shaft 33a of the rivet 33 is inserted into a through hole 32a formed at the center of the aluminum plate 32, and then, a flange 33b is press-engaged into the through hole 32a by pressing. The dimension of an inner diameter of the through hole 32a formed at the plate 32 is slightly greater than that of an outer diameter of the shaft 33a of the rivet 33 and sufficiently smaller than that of an outer diameter of the flange 33b. As a consequence, the flange 33b presses and enlarges the through hole 32a by press-fitting, to be thus turned to a press-engaged state, and further, the press-enlarged portion is brought into press-contact with the shaft 33a, to be thus integrated therewith. Moreover, a circular recess 33c is formed at the center of the tip surface of the shaft 33a in the rivet 33. The shaft 33a is inserted into the respective through holes of the upper gasket 15, the engagement portion 12 of the cover 3, the lower gasket 16, and the negative electrode current collector 18 in a later-described manner, and then, the recess 33c is pressed and enlarged while holding the members therein, followed by securely caulking.

The upper gasket 15 is made of a synthetic resin, wherein the inner space of a frame formed into a rectangular shape, as viewed on plane, is divided into an upper terminal holding recess 37 and a lower containing recess 38 via a partition 36. Tongue pieces 39 extend sideways from one of sides constituting a lower opening edge. A tubular portion 36a extending downward from the ceiling is formed at the center of the partition 36. The tubular portion 36a is engaged to a through hole 40a formed at the lower gasket 16 through the through hole 12c formed at the engagement portion 12. A lock hole 39a is formed in each of the two tongue pieces 39, and thus, is engaged to the lock projection 17 formed in the cover 3. The upper gasket 15 conforms to the engagement portion 12 in the cover 3 formed into the rectangular shape, as viewed on plane, and therefore, it can be prevented from being positionally deviated in the rotational direction only by its placement on the engagement portion 12. In addition, the insertion of the lock projection 17 into the lock hole 39a can securely prevent any positional deviation in the rotational direction.

The lower gasket 16 is a plate formed into a rectangular shape, as viewed on plane, and further, is made of a synthetic resin having a through hole 16a at the center thereof. The lower gaskets 16 on the negative electrode side and the positive electrode side are slightly different from each other in shape.

A lower gasket 16A on the negative electrode side includes an expanded portion 40 to be contained inside of the engaged recess 12a formed at the engagement portion 12 in the cover 3 and a flat portion 41 continuous to the expanded portion 40.

The expanded portion 40 is formed into a shape in conformity with the inner surface of the engaged recess 12a of the engagement portion 12 except one side thereof, and further, the through hole 40a is formed at the center thereof. The flat portion 41 is arranged to the guide recess 12b of the engagement portion 12. The lower gasket 16A on the negative electrode side is contained from below inside of the engaged recess 12a constituting the engagement portion 12 in the cover 3, and thus, is held between the cover 3 and the negative electrode current collector 18. In this held state, the lower gasket 16A aims at the insulation between the negative electrode current collector 18 and the cover 3, and further, seals the through hole 12c formed in the engagement portion 12 in the cover 3 together with the upper gasket 15.

On the other hand, a lower gasket 16B on the positive electrode side is formed into a flat shape, and further, has a through hole 16a at the center thereof, and thus, is contained inside of the engaged recess 12a constituting the engagement portion 12. The lower gasket 16B on the positive electrode side seals the through hole 12c formed in the engagement portion 12 in the cover 3 together with the upper gasket 15.

With the battery having the above-described configuration, the positional deviation in the rotational direction can be prevented only by locating the containing recess 38 of the upper gasket 15 at the engagement portion 12 in the cover 3. Consequently, when the shaft 31 of the external terminal 14 is inserted into the respective through holes of the upper gasket 15, the cover 3, the lower gasket 16, and the current collector 13, followed by securely caulking, the upper gasket 15 can be prevented from being positionally deviated. Thus, it is possible to enhance workability of a series of assembling work.

Incidentally, the present invention is not limited to the configuration described in the embodiment, and it may be variously modified.

For example, the upper gasket 15 is not limited to the rectangular shape, as viewed on plane, but it may be formed into various shapes, for example, a polygon such as a triangle and a pentagon or more, and an ellipse other than a circle, as viewed on plane. In summary, the upper gasket 15 may be configured in any manners as long as the positional deviation in the rotational direction can be prevented when it is attached. In some case, the upper gasket 15 may not conform to the shape of the engagement portion 12 in the cover 3.

Additionally, although the battery case 1 is formed into the rectangular parallelepiped shape, the engagement portion 12 in the cover 3 and the upper gasket 15 such configured as described above can be adopted even if the battery case 1 may be formed into other shapes such as a cylindrical shape.

Thus, the structure of the external terminal 14 for the battery according to the present invention may be applied to various batteries such as a lithium ion battery and a lead storage battery, etc.

According to the present invention, the engagement portion formed into a shape other than a circle, as viewed on plane, is formed in the cover, and further, the recess formed at the outside gasket is engaged to the engagement portion. Thus, when the external terminal and the like are fixed, the workability can be enhanced without any positional deviation of the outside gasket.

What is claimed is:

1. A battery, comprising: a battery case which includes a power generating element therein and whose top surface is opened; and a cover which closes the top surface, at which an external terminal exposed to an outside is disposed at an outer surface of the cover via an outside gasket, the cover comprising an engagement portion which expands outward and is formed into a shape other than a circle, as viewed on plane, wherein the outside gasket comprises a recess that is engaged to the engagement portion, and wherein the cover and the engagement portion are a one piece material.

2. The battery according to claim 1, wherein the outside gasket comprises the recess and another recess, to which a plate portion of the external terminal is arranged, by dividing a frame member via a partition.

3. The battery according to claim 1, wherein the cover comprises a lock portion formed at the outer surface thereof.

4. The battery according to claim 2, wherein the frame member is formed into a rectangular shape, as viewed on plane.

5. A battery, comprising: a battery case which includes a power generating element in and whose top surface is opened; a cover which closes an opening, the cover comprising a current collector to be connected to the power generating element via an inside gasket and comprising an external terminal exposed to an outside fixed via an outside gasket, the cover comprising a through hole and an engagement portion which expands outward and is formed into a shape other than a circle, as viewed on plane, wherein the external terminal comprises a shaft and a plate portion at an end of the shaft, the external terminal being caulked at another end of the shaft through the outside gasket, the cover, the inside gasket, and the current collector, wherein the outside gasket comprises a recess that is engaged to the engagement portion and a tubular portion which is inserted into the through hole formed in the cover, is fitted to the shaft of the external terminal, and is fitted to a through hole formed in the inside gasket, and wherein the cover and the engagement portion are a one piece material.

6. A battery according to claim 5, wherein the outside gasket comprises the recess and another recess, to which the plate portion of the external terminal is arranged, by dividing a frame member via a partition.

7. A battery according to claim 5, wherein the cover comprises a lock portion formed at an outer surface thereof.

8. A battery according to claim 6, wherein the frame member is formed into a rectangular shape, as viewed on plane.

9. The battery according to claim 1, wherein the recess of the outside gasket covers the engagement portion to engage with the engagement portion.

10. The battery according to claim 1, wherein the engagement portion has a rectangular shape.

11. The battery according to claim 1, wherein the engagement portion is disposed on a surface of the cover.

12. The battery according to claim 5, wherein the recess of the outside gasket covers the engagement portion to engage with the engagement portion.

13. The battery according to claim 5, wherein the engagement portion has a rectangular shape.

14. The battery according to claim 5, wherein the engagement portion is disposed on a surface of the cover.

15. The battery according to claim 3, wherein the outside gasket comprises a tongue piece extending along the cover formed therein, the tongue piece comprising a locked portion to be locked to the lock portion in a state in which the outside gasket is engaged to the engagement portion in the cover.

16. The battery according to claim 7, wherein the outside gasket comprises a tongue piece extending along the cover formed therein, the tongue piece comprising a locked portion to be locked to the lock portion in a state in which the outside gasket is engaged to the engagement portion in the cover.

17. The battery according to claim 1, wherein the recess is located inside the outside gasket.

18. A battery, comprising:
a battery case which includes a power generating element therein and whose top surface is opened; and a cover which closes the top surface, at which an external terminal exposed to an outside is disposed at an outer surface of the cover via an outside gasket, the cover comprising a protruding portion which expands outward and is formed into a shape other than a circle, as viewed on plane, wherein the outside gasket is located above the cover for covering the protruding portion, the outside gasket comprising a recess engaged to the protruding portion.

19. The battery according to claim 18, wherein the cover and the protruding portion are a one piece material.

20. The battery according to claim 18, wherein the recess is located inside the outside gasket.

* * * * *